United States Patent [19]

Mengel

[11] Patent Number: 4,837,627
[45] Date of Patent: Jun. 6, 1989

[54] PROGRAMMABLE OPERATING-PARAMETER CONTROL APPATATUS FOR A TELEVISION RECEIVER

[75] Inventor: William H. Mengel, Marlton, N.J.

[73] Assignee: RCA Licensing Corporation, Princeton, N.J.

[21] Appl. No.: 87,174

[22] Filed: Aug. 19, 1987

[51] Int. Cl.[4] .................. H04N 5/50; H04N 5/44; H04N 5/268; H04N 5/60

[52] U.S. Cl. .................. 358/191.1; 358/190; 358/194.1; 358/198; 358/181; 455/151; 455/185

[58] Field of Search .............. 358/190, 191.1, 194.1, 358/189, 181, 193.1, 198; 455/151, 186, 343, 355

[56] References Cited

U.S. PATENT DOCUMENTS

| | | | |
|---|---|---|---|
| 4,355,415 | 10/1982 | George et al. | 455/185 |
| 4,356,510 | 10/1982 | Nakayama | 358/198 |
| 4,488,179 | 12/1984 | Krüger et al. | 358/191.1 |
| 4,495,654 | 1/1985 | Deiss | 455/151 |
| 4,591,914 | 5/1986 | Hakamada et al. | 358/194.1 |
| 4,600,948 | 7/1986 | Dangschat | 358/190 |
| 4,700,230 | 10/1987 | Pshtissky et al. | 358/181 |

Primary Examiner—Howard W. Britton
Assistant Examiner—John K. Peng
Attorney, Agent, or Firm—Eugene M. Whitacre; Peter M. Emanuel; Thomas F. Lenihan

[57] ABSTRACT

A programmable auxiliary control unit for a television receiver has switch selectable features which enable it the receiver to interface more easily to a variety of signal sources, by controlling the operating parameters of the television receiver. The controlled parameters are, for example, automatic turn-on, automatic autoprogramming, automatic forcing of the television receiver to a predetermined channel, automatic increasing of the volume at the television receiver, and automatic disabling of the numeric keyboard of the television receiver.

14 Claims, 10 Drawing Sheets

FIG. 2B

| SWITCH POSITION | FUNCTION | FACTORY SETTING | OPTIONAL FIELD SETTING | REMARKS |
|---|---|---|---|---|
| SWITCH 1 | POWER | OFF | | TV MUST BE TURNED ON/OFF WITH TV'S POWER BUTTON OR TV'S REMOTE CONTROL. |
| | | | ON | TV WILL TURN ON AUTOMATICALLY WHENEVER AC POWER IS APPLIED TO TV. |
| SWITCH 2 | CHANNEL 3 | OFF | | NORMAL OPERATION. |
| | | | ON | TV WILL TUNE TO CHANNEL 3 WHEN TURNED ON. *NOTES:* • SWITCH 3 SHOULD BE IN OFF POSITION IF SWITCH 2 IS ON. • SWITCH 4 SHOULD BE IN ON POSITION IF SWITCH 2 IS ON. • IF BOTH SWITCH 2 & 3 ARE OFF, TV WILL TUNE TO CHANNEL 2 PROVIDED THE CABLE/NORM SWITCH IS IN NORM POSITION. |
| SWITCH 3 | CHANNEL 4 | OFF | | NORMAL OPERATION |
| | | | ON | TV WILL TUNE TO CHANNEL 4 WHEN TURNED ON. *NOTES:* • SWITCH 2 SHOULD BE IN OFF POSITION IF SWITCH 3 IS ON. • SWITCH 4 SHOULD BE IN ON POSITION IF SWITCH 3 IS ON. • IF BOTH SWITCH 2 & 3 ARE OFF, TV WILL TUNE TO CHANNEL 2 PROVIDED THE CABLE/NORM SWITCH IS IN NORM POSITION. |
| SWITCH 4 | AUTO PROGRAM | OFF | | AFTER A POWER INTERRUPTION, TV WILL AUTOMATICALLY AUTOPROGRAM CHANNEL SCAN MEMORY WHEN TV IS TURNED ON. *NOTE:* SWITCH 5 SHOULD BE IN OFF POSITION IF SWITCH 4 IS OFF. |
| | | | ON | DISABLES AUTOPROGRAM FEATURE. TV WILL HAVE TO BE MANUALLY AUTOPROGRAMMED AFTER A POWER INTERRUPTION. |
| SWITCH 5 | VOLUME UP | OFF | | WHEN TV IS TURNED ON, TV'S VOLUME WILL COME ON TO ITS PREVIOUSLY SET LEVEL. AFTER A POWER INTERRUPTION, TV'S VOLUME WILL COME ON TO A NOMINAL LEVEL. |
| | | | ON | WHEN TV IS TURNED ON, TV'S VOLUME WILL BE AUTOMATICALLY RAISED TO ITS MAXIMUM LEVEL PRESET BY VOLUME LIMITER CONTROL. *NOTE:* SWITCH 5 SHOULD BE IN OFF POSITION IF SWITCH 4 IS IN OFF POSITION. |
| SWITCH 6 | KEYBOARD DISABLE | OFF | | INSTRUMENT KEYPAD (0-9) ON TV IS FULLY OPERATIONAL. |
| | | | ON | INSTRUMENT KEYPAD (0-9) ON TV IS DISABLED. |

*FIG. 9*

PROGRAMMABLE OPERATING-PARAMETER CONTROL APPATATUS FOR A TELEVISION RECEIVER

FIELD OF THE INVENTION

This invention relates to the field of television receivers having programmable features.

BACKGROUND OF THE INVENTION

The number of signal sources for television receivers has increased in recent years to include not only broadcast signals, but also, signals from videocassette recorders (VCRs), videodisc players, and cable converter units. As a result of this variety of signal sources, the selection of operating parameters for television receivers has become increasingly more complex. For example, the RF modulators of VCRs and videodisc players are generally programmable to provide their signals in the channel 3 or channel 4 frequency range to allow the user to select whichever of channel 3 or 4 is unused by broadcasters in his local area. Thus, the television receiver must be tuned to the preselected output channel in order to receive VCR or videodisc signals.

As another example of how the operating parameters of the television receiver should accommodate the signal source consider that in many instances, viewers use the RF tuner in their VCR to select channels for viewing, rather than using the tuner on their television receiver because, for example, the VCR may have remote control capability, and the television receiver may not. Similarly, cable converter units generally remodulate received broadcast and cable channel frequencies to a predetermined television channel, usually channel 2, 3, or 4. Some cable converters now in use, for example, M/A-COM Model 3025, allow remote control of the volume as well as remote control of channel selection. In order to make full use of this feature, the volume control of the television receiver must be turned fully on. However, other cable converters do not include this feature, requiring that volume control be accomplished via the television receiver volume control. Because the choice of these operating parameters is dictated primarily by the type of equipment connected to the television receiver, and by the channels available in the local broadcasting area of the viewer, presetting of these operating parameters at the factory is not feasible. Therefore, an "in-home parameter set-up" of the television receiver must be performed by the user. This may entail: turning on the receiver, selecting the proper channel, adjusting the volume control at the television receiver. In addition, some television receivers include scanning the range of channels and storing information relating to active channels encountered during the scan in a preferred channel memory. Automatic activation of this feature may be undesirable if the user's television receiver is connected to a signal source which provides television signals on a single channel only However, an automatic initialization of the autoprogramming feature may be desirable to those viewers whose television receivers are coupled to an antenna, for example. Therefore the in-home parameter set-up may also include initializing autoprogramming of the television receiver's preferred channel memory.

For those viewers whose television receivers include a mechanical tuner, a mechanical on/off switch, and a volume control potentiometer, the in-house set-up of the operating parameters need only be performed once, because the above-listed mechanical components retain their respective settings when power is interrupted.

Many modern television receivers are controlled electronically via a keyboard or remote control. These receivers rely on non-volatile memory, or volatile memory maintained by a standby power supply, to retain the last channel data and last volume setting data required as operating parameters for their particular television system. Standby power supplies are commonly used in televisions using volatile memories for maintaining the preferred channel list when the receiver is turned off. Standby power supplies are also used when the television receiver includes a remote control unit because the remote control unit must be continuously active in order to receive and process a TV-ON command. However, because standby power is dependent upon the AC power delivered to the television receiver, it is subject to interruption when the AC power fails. If the AC power fails for a period greater than the discharge time of the capacitors in the standby power supply, the data in the volatile memory devices of the receiver will be lost, requiring reprogramming of these parameters by the user after power returns.

Some cable converter units include a switched AC power outlet for supplying AC power to a television receiver, enabling the receiver to be turned on and off under remote control via the cable converter unit. However, this is only possible with receivers which have a manual on-off switch and not with receivers which have an electronic on-off switch. Thus, to use the remote control of the cable converter, for an electronically controlled television, a user must first cause the television to be turned on. In addition, as stated above, many modern television receivers have electronic tuning rather than mechanical tuning, and when power is first applied, those receivers automatically tune to a particular channel, usually channel 2. A television which automatically tunes to a channel other than the output channel of the cable converter unit connected to it, causes the annoyance that the user must retune the television receiver.

U.S. Pat. No. 4,651,342 (Mengel), issued 17 Mar. 1987 to the present inventor, discloses an auxiliary control unit for a television receiver which senses the development of standby power, automatically turns on the receiver, and automatically tunes the receiver to a a programmable initial channel. As stated above, however, it may not be desirable to provide the function of auto turn-on in some instances, and while the reference discloses forcing the tuner to a particular channel, no provision is disclosed for adding that channel in a preferred channel memory, or automatically initiating an autoprogramming function.

An additional problem is confronted when a television is coupled with a cable converter unit in a hotel/motel environment. A guest, who may be unfamiliar with the particular cable television system of the institution, may inadvertently change channels at the television receiver rather than via the cable converter unit and, thereby detuning the television receiver from its required channel, and losing signal reception capability. As a result, the guest may become confused, erroneously believing the system to be faulty, and may generate a needless service call.

SUMMARY OF THE INVENTION

An apparatus for enabling a television receiver to operate in accordance with preselected parameters includes circuitry for detecting an initial application of standby power to the television receiver, and generating a signal indicating that standby power has been detected. The apparatus also includes a first programmable switch for selecting an operating parameter to be implemented, and control circuitry responsive to the setting of the first switch, and to the detection signal for generating a first control signal to cause the television receiver to operate in accordance with the selected first operating parameter.

The apparatus also includes a second programmable switch for selecting a second operating parameter from a predetermined group of operating parameters. A second control circuit, responsive to the setting of the second switch and to the development of operating power in the receiver when the receiver is activated, generates a second control signal to cause the receiver to operate in accordance with the selected second operating parameter.

An additional aspect of the invention is that the selected first and second operating parameters exhibit a hierarchy of selection.

Another aspect of the invention is that one of the group of operating parameters which may be selected, is the automatic setting of the volume at the television receiver to a predetermined high level being at least normal listening level.

Yet another aspect of the invention is that one of the group of operating parameters, which may be selected, is the disabling of the television receiver channel selection keyboard to prevent user input.

Still another aspect of the invention is that a parameter which may be selected is automatic activation of the television receiver.

A further aspect of the invention is that a parameter which may be selected is forcing the tuner to tune to a particular preselected channel, and automatically storing data relating to the "forced" channel into a preferred channel memory in the tuner.

BRIEF DESCRIPTION OF THE DRAWING

FIGS. 2A and 2B, intended to be read together, illustrate an embodiment of the invention partly in block diagram form and partly in schematic diagram form;

FIG. 9 is a table of switch functions useful in understanding the invention.

DETAILED DESCRIPTION OF THE DRAWING

Figure 1:
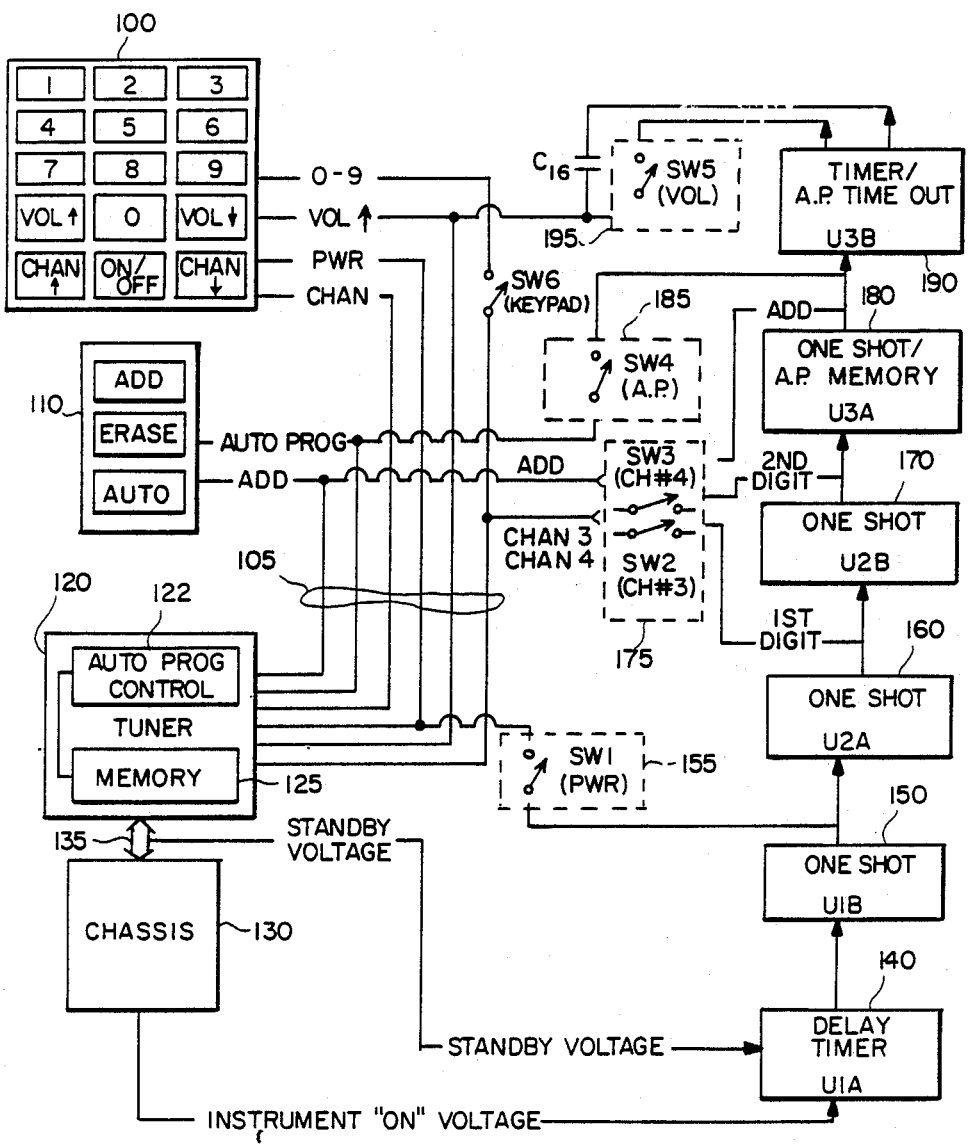
FIG. 1 is a block diagram useful in understanding the operation of the circuitry of FIG. 2.

Referring to FIG. 1, a keyboard 100 having keys for the digits 0-9, and for the functions of power "on/off", volume up, volume down, channel up, and channel down is connected via bus 105 to a tuner 120. Tuner 120 may include an autoprogramming control unit 122, and a preferred channel memory device 125 for automatically scanning a range of frequencies and storing data relating to a list of active channels. This feature enables the tuner to skip all inactive channels when a channel up, or channel down, command is received via keyboard 100, or via an infrared (IR) remote control (not shown), and thus increase channel tuning speed.

Program keyboard 110, also connected to tuner 120 via bus 105, includes keys for the functions of add, erase and autoprogram, which when pressed alter the contents of tuner memory 125. For example, when the ADD key is pressed, data relating to the currently tuned channel is added to the preferred channel memory 125. When the ERASE key is pressed, data relating to the currently tuned channel is erased from the preferred channel memory 125. The effect of pressing the autoprogramming (AUTO) key has been described above.

Tuner 120 is connected to a chassis 130 and receives operating power (active when the receiver is turned on), and standby power (active so long as the receiver is plugged into the AC line, whether or not the receiver is turned on) via bus 135. Tuner 120 provides television signals to chassis 130 via bus 135 for processing in circuitry of chassis 130 for ultimate display of video signals on a display screen (not shown), and for ultimate reproduction of audio signals via a speaker (not shown).

The system described thus far is known, for example, from "RCA Color Television Basic Service Data" 1986, CTC-133 available from RCA Technical Publications, Indianapolis, Indiana.

Timers 140-190 form a timing chain for simulating keyboard commands at the proper time intervals. A signal applied to the trigger input of timer 140 causes a delayed trigger signal to be applied to timer 150 which in turn applies a delayed trigger signal to timer 160, and so on. Switches $Sw_1-Sw_6$ are single-pole, single-throw (SPST) switches preferably included in a dual inline package (DIP) switch array.

Both standby voltage and operating (instrument "on") voltage are coupled to delay timer 140 and its associated circuitry. Each of delay timers 140-190 includes a "one-shot" circuit (monostable multivibrator) which corresponds to one-half of one of the dual one-shot integrated circuits U1-U3 of FIG. 2. When the automatic power-on function is selected (switch $Sw_1$ closed) delay timer 140 will respond to the initial application of standby voltage to produce a trigger to one-shot 150, which in turn generates a control signal simulating the pressing of the power-on key of keyboard 100. This selection allows a television receiver with electronic on/off control, to be plugged into controlled switched AC outlets, for example, on the back of some cable converter units, and thereby take advantage of the remote control turn-on feature provided by such cable converter units. This is accomplished by sensing that AC has been applied (standby power developed) and automatically turning the receiver on.

If the automatic power-on feature has not been selected (switch $Sw_1$ open), then delay timer 140 will respond to the application of operating voltage to the receiver for generating its output trigger pulse. For simplicity, in FIG. 1 switches $Sw_1-Sw_6$ are shown enclosed by dotted boxes 155, 175, 185 and 195 in order to indicate that the switches also control other functions to be described in detail with reference to FIG. 2. For example, FIG. 1 shows only that switch $Sw_1$ couples the power-on command to the receiver, however, switch $Sw_1$ also controls the decision of which voltage supply is to be used as a trigger source for timer 140, as will be explained with reference to FIGS. 2A and 2B.

As stated above, in some applications such as when the television receiver is connected to some cable converter units, it is necessary to tune the receiver to a particular channel in order to receive television signals. The output signal of timer one-shot 150 also triggers one-shot 160. One-shot 160 simulates the pressing of the first digit of the desired channel on keyboard 100 (in this embodiment the first digit is always a zero) and also triggers one-shot 170. One-shot 170 simulates the pressing of the second digit of the desired channel on keyboard 100 (in this embodiment the second digit may be a three ($Sw_2$ closed) or a four ($Sw_3$ closed). If the default channel of the receiver on power up is channel 2, and channel 2 is the required channel, then both switches $Sw_2$ and $Sw_3$ are left in the open state since no "forcing" of the receiver to another channel is necessary.

If the tuning of channel 3 or channel 4 is forced, then the channel should be added to the preferred channel list stored in the tuner memory 125. To accomplish this ADD function one-shot 180 in response to a trigger signal from one-shot 170, generates a signal which simulates the pressing of the ADD key of keyboard 110. The ADD signal is shown passing through dotted block 175 in order to indicate that the ADD function is activated by the selection of either channel 3 or channel 4.

One-shot 180 serves a dual purpose. It either provides the ADD signal described above, or it produces an automatic autoprogramming signal which simulates the pressing of the automatic programming key (AUTO) of keyboard 110.

Timer 190 is also programmable via volume switch $Sw_5$ to cause the receiver to ramp the volume up to a high level (limited by a volume limiter control, not shown, on chassis 130). This allows a viewer to control the volume via a cable converter unit if the cable converter unit includes that feature. If the volume were not ramped up at the television receiver automatically, the viewer would be forced to increase the volume at the receiver manually, in order to use the cable converter volume control.

The arrangement of FIG. 1 is provided with logic such that certain, possibly conflicting, modes of operation do not occur. In other words, certain operating parameters are given precedence over others. For example, the selection of automatic autoprogramming conflicts with the selection of channel 3 or channel 4 as a required channel, and automatic autoprogramming therefore takes precedence. Activation of the automatic autoprogramming function is selected by opening switch $Sw_4$.

Further, the logic is such that if automatic receiver activation (automatic turn-on) is not selected, then the television receiver is probably not connected to a cable converter unit having remote volume control. Therefore, if automatic receiver turn-on is not selected, then automatic volume ramp-up at the receiver is not available for selection.

Furthermore, due to high frequency transmission difficulties, most of the cable converter units intended for institutional environments such as hotel/motel or hospitals, limit the range of tunable channels they supply to the range from channel 2 to cable channel 36. Therefore, when automatic autoprogramming is selected, a shortened autoprogramming time period is provided by generating an autoprogramming time-out signal at one-shot 190, and coupling it via capacitor $C_{16}$ to simulate a brief volume-up keypress, and thereby interrupt the autoprogramming sequence.

Lastly, setting switch $Sw_6$ to the "on" position causes numerical entry via keyboard 100 to be disabled. This feature prevents a viewer from changing channels at the television and, in effect, forces channel changing operation to be accomplished via the cable converter unit. Thus, the viewer cannot tune away from a required channel, and thereby become confused at the loss of television signals for viewing.

FIG. 9 is useful as a guide to the switch-selectable functions available in apparatus according to the invention.

Switches $Sw_1$ to $Sw_6$ are arranged such that when they are all in the "OFF" position, the television receiver will perform in the usual, normal manner. Arranging the switches that they are all off in the same mechanical position, facilitates factory set-up since the assembly-line workers need not program various switch settings, but rather need only to ensure that all switches are in the same position.

Figure 2A:
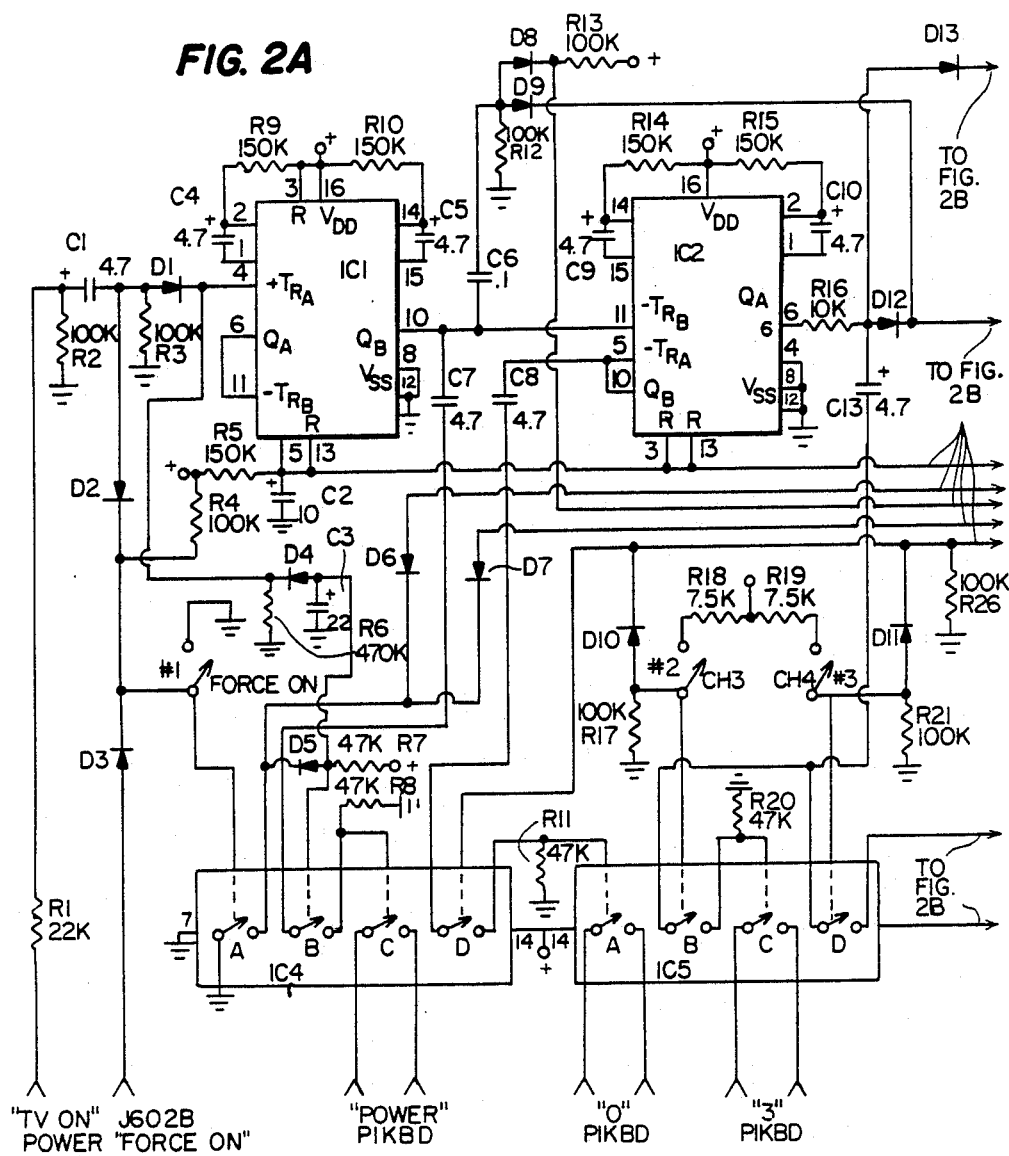
Figure 2B:
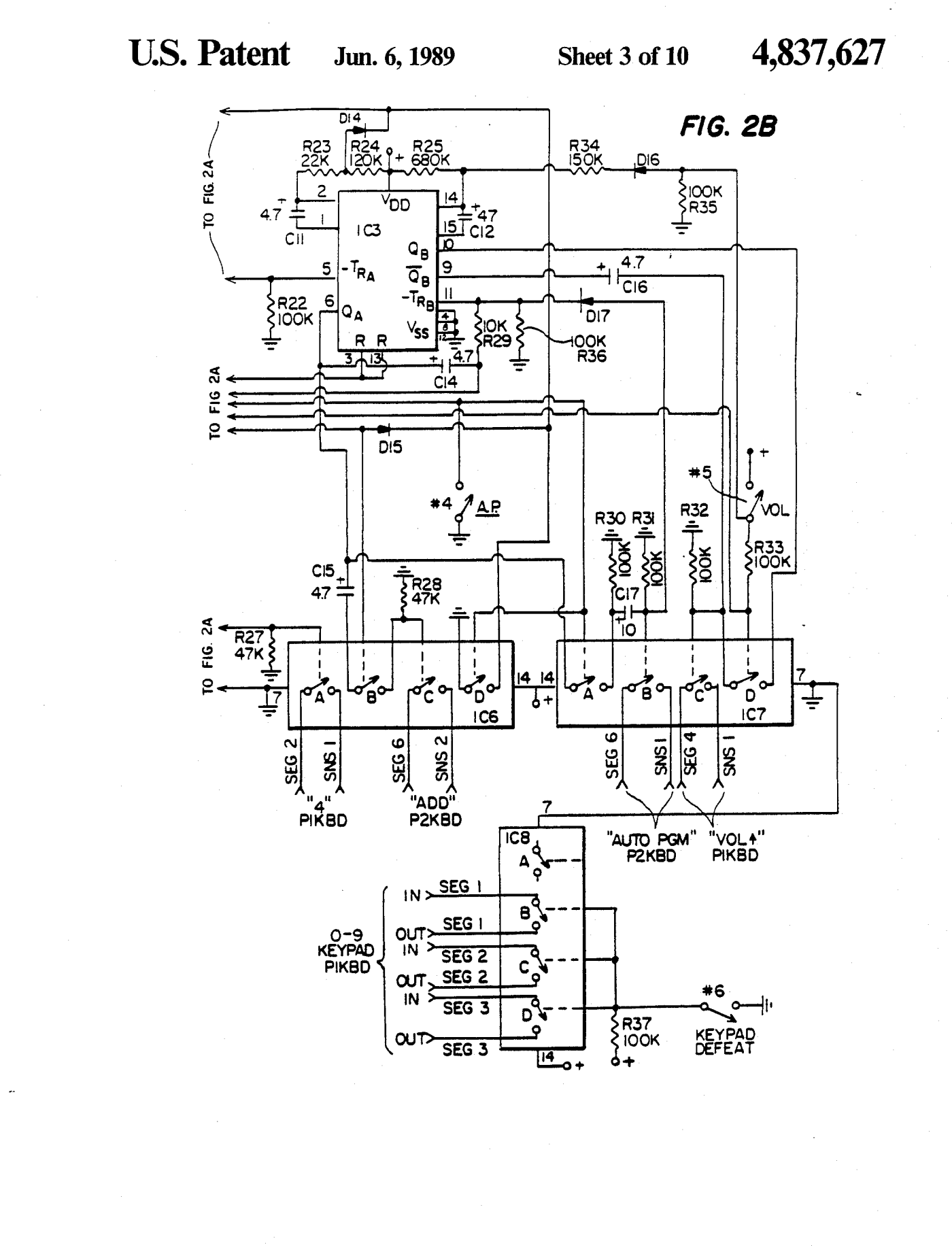

Turning now to FIGS. 2A and 2B, a more detailed explanation of that embodiment of the invention will be presented.

Each of the terminals marked with a plus sign ($+$) in FIG. 2 is connected to a standby power supply which provides standby voltage whenever the receiver is plugged into the AC line whether or not the receiver is turned on. Receiver operating power is connected to the circuitry of FIG. 2 at the terminal marked "TV ON" power.

As can be seen from FIG. 9, the television receiver arrives at its destination with switches 1–6 in the off (open) position. Thus, the following operating parameters are selected: normal manual turn-on, no forced channel, automatic autoprogramming, volume set to a nominal value, and unrestricted keyboard operation.

Referring to FIGS. 2A and 2B, the factory-set parameters will be described first. In the following discussion, the term high level signal means a signal with an amplitude approximately equal to the amplitude of the standby voltage (e.g., $+11$ volts). A low level signal means a signal at or near zero volts. Also, the terminology $IC_{6D}$, for example, means switch segment D of electronic switch array $IC_6$. Manual turn-on is caused as follows. Because switch $Sw_1$ is open, a high level signal is applied via $R_4$ to the cathodes of diodes $D_2$ and $D_3$, and to the control input $IC_{4A}$. Electronic switch arrays $IC_4$–$IC_8$ are preferably CMOS circuits, all may be, for example, CD4016B integrated circuits. Switch $IC_{4A}$ is thereby closed, forward biasing diodes $D_5$, $D_6$ and $D_7$. Because $D_5$ is forward biased, the voltage at the junction of the anode of $D_5$ and resistor $R_7$ is approximately one diode drop above ground potential (0v). This low level signal is connected to the control input of switch $IC_{4B}$ causing switch $IC_{4B}$ to remain open. The same low level signal is also applied to the junction of the anode of diode $D_4$ and capacitor $C_3$, reverse biasing diode $D_4$ which prevents a signal from reaching terminal 4 (the plus trigger input ($+TR_A$) for the A section of dual one-shot $IC_1$), and thus preventing $IC_1$ from generating an automatic turn-on signal. One-shot circuits $IC_1$–$IC_3$ are preferrably CMOS circuits, and may be, for example, CD4538 integrated circuits. Because switches 2 and 3 are open, the receiver will not be forced to tune either channel 3 or channel 4.

Switch $Sw_4$ being in an open state, does not ground the junction of the cathode of diode $D_8$ and resistor $R_{13}$.

As a result, diode $D_8$ is reverse biased, and a high level signal appears at the control inputs of switch $IC_{6D}$, and switch $IC_{7A}$, causing both of these switches to close. The closing of $IC_{6D}$ connects a low level signal, via forward-biased diode $D_{15}$, to the control input of switch $IC_{4D}$, causing switch $IC_{4D}$ to remain open. This prevents the generation of the first digit of a "forced" channel number. This low level signal also forward biases diodes $D_{10}$ and $D_{11}$ which prevents an actuation of switches 2 and 3 from having any effect, thus precluding the generation of the second digit of a "forced" channel number. The closing of switch $IC_{6D}$ also causes a low level to appear at the cathodes of diodes $D_{13}$ and $D_{14}$, forward biasing both of them. The forward biasing of diode $D_{14}$ disrupts the operation of the timing circuitry of $IC_{3A}$ which, in effect, transforms $IC_{3A}$ from a monstable multivibrator (one-shot) into an R-S flip-flop having terminal 5 as a set terminal and terminal 3 as a reset terminal. The forward-biasing of $D_{13}$ bypasses the output of $Q_A$ of $I_{C2}$ to ground to prevent erroneous generation of set commands to $IC_{3A}$ when $IC_{3A}$ is operated as an R-S flip-flop.

The wiper of switch $Sw_5$ is connected to the junction of the anode of diode $D_{16}$ and resistor $R_{35}$. Because switch $Sw_5$ is open, and because a low level signal is connected to its wiper via $R_{33}$, diode $D_7$ and the closed contact of switch $IC_{4A}$, diode $D_{16}$ is reversed-biased. Because diode $D_{16}$ is reversed-biased, $R_{34}$ is isolated, and has no effect on the timing circuit $C_{12}$, $R_{25}$ of $IC_{3B}$, causing $IC_{3B}$ when triggered to time out in approximately 25 seconds.

The numeric digits of keyboard 100 (of FIG. 1) are conveyed by wires connected in series with switches $IC_{8B}$, $IC_{8C}$, and $IC_{8D}$, respectively. Keyboard 100 operates normally because switch $Sw_6$ is open, and therefor does not cause the interruption via switches $IC_{8B-D}$ of the signals representing the numeric digits 0–9.

Figure 3:
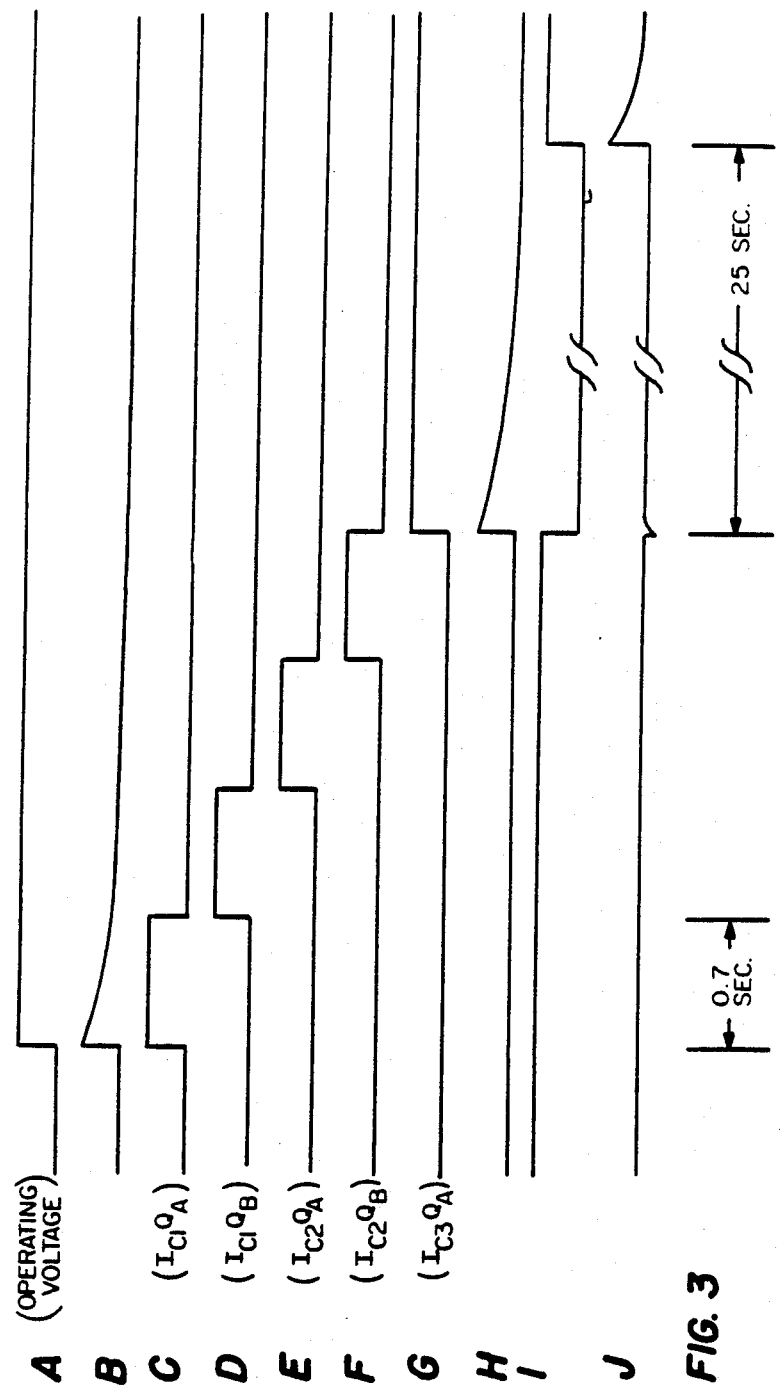
FIGS. 3 and 4 are timing diagrams useful in understanding the operation of the circuitry of FIGS. 2A and 2B.
Figure 5:
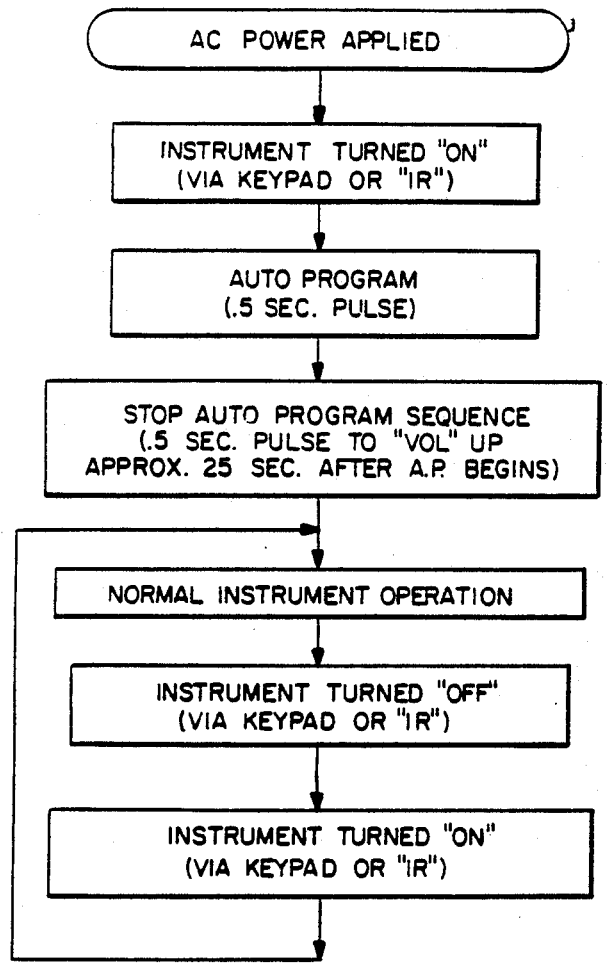
FIGS. 5, 6, 7 and 8 are flow charts useful in understanding the invention.

Having discussed the static condition of the factory-set parameters, please refer to the timing diagrams of FIG. 3 for a discussion of the system operation in accordance with the factory-set parameters. When a user turns on the receiver via keyboard 100, a high level (operating voltage) (waveform A of FIG. 3) appears at the terminal marked "TV-ON power". This level is coupled via voltage divider $R_1$, $R_2$, to a differentiater circuit comprising capacitor $C_1$, and resistor $R_3$ which generates a pulse B and applies it via diode $D_1$ to the junction of terminal 4 (+trigger) of $IC_{1A}$, and pull-down resistor $R_6$. Pulse B is blocked from farther passage by reversed-biased diode $D_4$. In response to the trigger pulse, $IC_{1A}$ generates a 0.7 second positive-going pulse (C) at terminal 6 ($Q_A$) This positive-going pulse C is applied to terminal 11 (−Trigger) of $IC_{1B}$. When the 0.7 second delay pulse C of $IC_{1A}$ falls, $IC_{IB}$ is triggered into producing its own 0.7 second positive-going pulse D at terminal 10 ($Q_B$) Pulse D is applied via capacitor $C_7$ to the open contact of switch $IC_{4B}$, and via capacitor $C_6$ to the junction of the anode of diodes $D_8$ and $D_9$ and resistor $R_{12}$. Diode $D_9$ is thereby biased into conduction, passing pulse D to the junction of the cathode diode $D_{12}$, resistor $R_{22}$, and terminal 5 (+trigger) of $IC_{3A}$. Pulse D from $IC_1$ terminal 10 is also applied to terminal 11 (−trigger) of $IC_{2B}$, which upon the completion of the pulse, generates a further 0.7 second positive-going pulse E at terminal 10 ($Q_B$) of $IC_{2B}$. The timing of the 0.7 second pulses produced by $IC_{1A}$, $IC_{1B}$, $IC_{2A}$, and $IC_{2B}$ is controlled by timing circuits comprising resistor $R_9$ and capacitor $C_4$, resistor $R_{10}$ and capacitor $C_5$, resistor $R_{14}$ and capacitor $C_9$, and resistor $R_{15}$ and capacitor $C_{10}$, respectively. Pulse E is applied to terminal 5 (−trigger) of $IC_{2A}$ which generates a 0.7 second positive-going pulse F at terminal 6 of $I_{C2}$ having no effect due to a blocking low level signal applied via diode $D_{13}$. Pulse E is also applied via capacitor $C_8$ to the open contact of switch $IC_{1D}$. The falling edge of pulse D triggers $IC_{3A}$ which generates waveform G of FIG. 3 at $IC_3$ terminal 6. $IC_{3A}$ is prevented from timing out by forward-biased diode $D_{14}$ which interferes with timing circuit comprising resistors $R_{23}$, $R_{24}$, and capacitor $C_{11}$ by clamterminalg the voltage at $IC_3$ terminal 2 to a low level. The signal of waveform G is applied to capacitor $C_{14}$ without effect since the other side of capacitor $C_{14}$ is biased near ground level by forward-biased diode $D_6$ through closed switch $IC_{4A}$. The signal of waveform G is also applied to capacitor $C_{15}$, also without effect due to open switch contact $IC_{6B}$. The signal of waveform G is also applied through closed switch contact $IC_{7A}$ to the junction of resistor $R_{30}$ and $C_{17}$. A differentiated waveform H appears at the junction of $C_{17}$ and $R_{31}$, the control input of switch $IC_{7B}$, and the anode of diode $D_{17}$. As a result switch $IC_{7B}$ is closed for approximately 0.5 seconds, connecting together for that period wires SEG6 and SNS1 to simulate an autoprogramming (AUTO) key closure (on keyboard 110 of FIG. 1). Signal H is also coupled via forward-biased diode D17 to terminal 11 (−trigger) of $IC_{3B}$. The falling edge of signal H triggers $IC_{3B}$ to produce signal I having a duration of approximately 25 seconds at the $\bar{Q}$ output, terminal 9. Signal I is differentiated by capacitor $C_{16}$ and resistor $R_{32}$ to form signal J which is applied to the control input of switch $IC_{7C}$. The positive-going portion of the waveform activates switch $IC_{7C}$ at the end of the 25 second period simulating a 0.5 second keypress of volume up (on keyboard 110 of FIG. 1) by connecting together the wires marked SEG4 and SNS1. Thus, a manual turn-on of the receiver and the initiation of a 25 second limited autoprogramming feature has been described. This operation is illustrated by the flowchart of FIG. 5.

Figure 4:
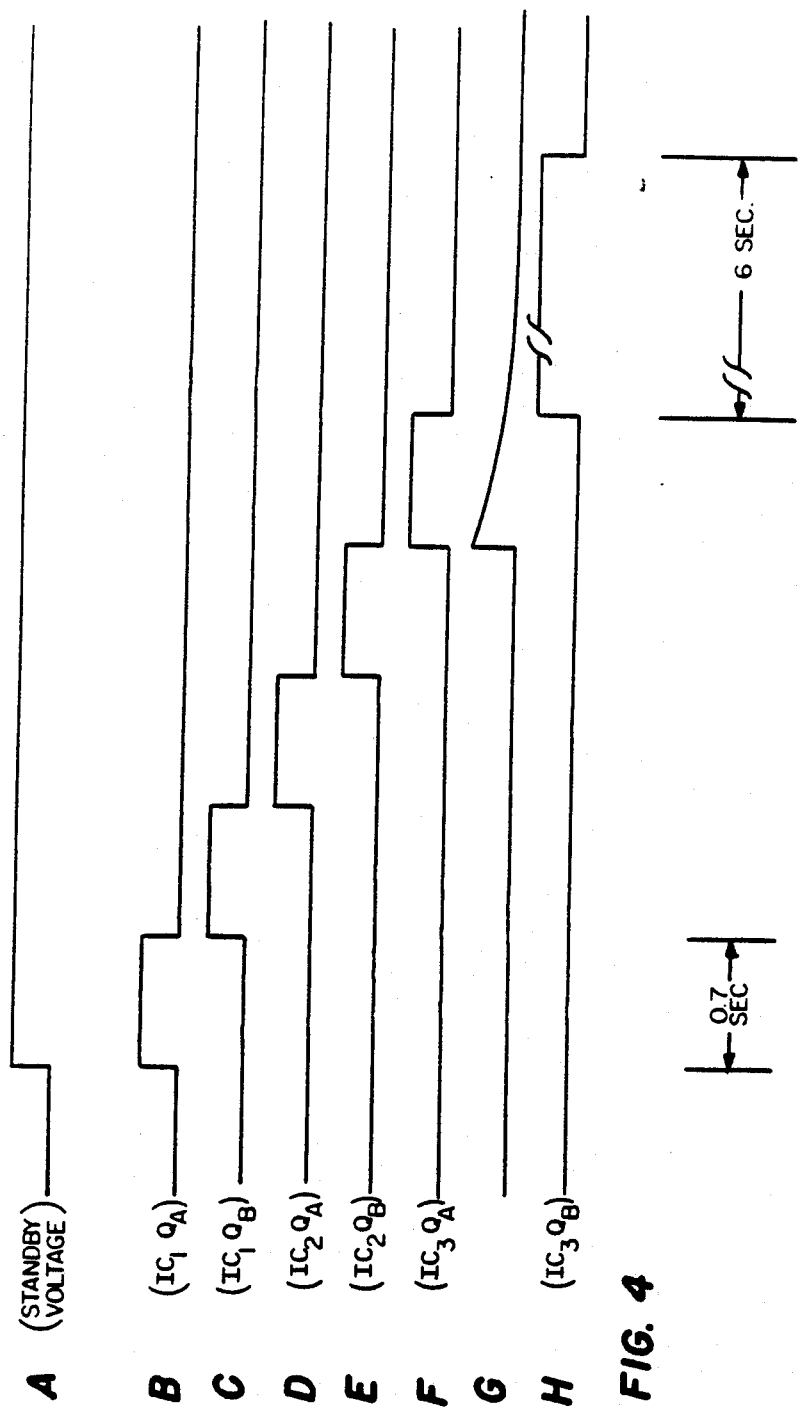

Next, with reference to FIGS. 2A, 2B, and 4, the features of automatic turn-on, force to channel 3, and volume ramp-up will be described. Under these desired conditions, switches 1, 2, 4 and 5 are closed. The embodiment of FIGS. 2A and 2B is designed to interface with a variety of tuners. Some of these tuners require that a "power on" switch closure be simulated, while others are equipped with a single terminal which, when pulled to a low level, initiates a turn-on function. Accordingly, the embodiment of FIGS. 2A and 2B includes means for exercising both of the above options.

When switch $Sw_1$ is closed a low level signal (ground) is applied to the cathode of diode $D_6$, forward biasing $D_6$ and pulling terminal J602B low. J602B is intended to be connected to those tuners having a single-terminal "force on" feature. The low level signal from switch $Sw_1$ is also coupled to the cathode of diode $D_2$ which forward-biases diode $D_2$ and prevents a power on signal from retriggering $IC_{1A}$ when operating power is developed in chassis 130 (on FIG. 1). The low level signal from switch $Sw_1$ is also coupled to the control input of switch $IC_{4A}$ causing switch $IC_{4A}$ to remain open. Because $IC_{4A}$ is open a high level (waveform A) is developed at the cathode of diode $D_5$, the anode of which is connected to standby voltage via resistor $R_7$. The voltage at the junction of resistor $R_7$, the anode of diode $D_5$, the anode of diode $D_4$, and the control input of $IC_{4B}$, causes switch $IC_{4B}$ to become conductive, forming a signal path for later use. The high level signal developed at the cathode of diode $D_5$ is also coupled to the cathodes of diodes $D_6$ and $D_7$, reverse biasing them. The high level signal applied to the anode of diode $D_4$ is integrated by capacitor $C_3$ and pull down resistor $R_6$, and applied to terminal 4 (+trigger) of $IC_{1A}$, causing a 0.7 second positive-going pulse B to appear at the Q output (terminal 6). Pulse B is coupled directly to terminal 11 (−trigger) of $IC_{1B}$ causing a 0.7 second positive-going pulse C to be generated upon the expiration of pulse B. Pulse C appears on terminal 10 of $IC_{1B}$ and is coupled via capacitor $C_7$ through closed switch contact $IC_{4B}$ to the junction of resistor $R_8$ and the control input of switch $IC_{4C}$, causing switch $IC_{4C}$ to close and connect the wires marked SEG5 and SNS2 together. This simulates a pressing of the "power on" key (on keyboard 100 of FIG. 1) and causes the television to turn on.

The closure of switch $Sw_4$ deselects the autoprogramming function by causing a low level signal (ground) to appear at the control input of switch $IC_{7A}$. Because the combination of switch $IC_{7A}$ and $IC_{7B}$ control the autoprogramming function, defeating switch $IC_{7A}$ prevents autoprogramming from occurring. The low level signal from switch $Sw_4$ is also applied to the junction of the cathode of diode $D_8$, and resistor $R_{13}$, forward biasing diode $D_8$. This causes a low level signal to be developed at the junction of the anodes of diodes $D_8$ and $D_9$, resistor $R_{12}$, and capacitor $C_6$, preventing pulse C from passing through diode $D_9$.

Closing switch $Sw_2$ (forcing the selection of channel 3) places a high level signal, via $R_{18}$, on the control input of switch, $IC_{5B}$, causing switch $IC_{5B}$ to close which sets up a signal path for future use. The high level signal from switch $Sw_2$ is also applied to the junction of pull down resistor $R_{17}$ and the anode of diode $D_{10}$, which forward biases diode $D_{10}$. A high level signal is also applied to the control inputs of switches $IC_{4D}$ and $IC_{6B}$ setting up signal paths for future use. The high level signal also forward biases diode $D_{15}$, and reverse biases diodes $D_{13}$ and $D_{14}$.

Pulse C is also applied to terminal 11 (−trigger) of $IC_{2B}$ which generates a 0.7 second positive-going pulse D at terminal 10 ($Q_B$) of $IC_{2B}$ when pulse C expires. Terminal 10 of $IC_{2B}$ is connected directly to terminal 5 (−trigger) of $IC_{2A}$ which causes the generation of a further 0.7 second pulse E at terminal 6 ($Q_A$) when pulse D expires. Pulse D is also coupled via capacitor $C_8$ and closed switch $IC_{4D}$ to the junction of resistor $R_{11}$ and the control input of switch $IC_{5A}$. This causes switch $IC_{5A}$ to close for approximately 0.5 seconds simulating the pressing of the "0" key of keyboard 100 (on FIG. 1). This is the first digit of the desired entry "03". Pulse E, developed at terminal 6 of $IC_{2A}$, is coupled via resistor $R_{16}$, capacitor $C_{13}$, and the closed contacts of switch $IC_{5B}$ to the junction of resistor $R_{20}$ and the control input of switch $IC_{5C}$, causing switch $IC_{5C}$ to close and connect wires SEG1 and SNS3 together to simulate the pressing of the "3" key of keyboard 100 (on FIG. 1). This is the second digit of the desired entry "03".

Figure 6:
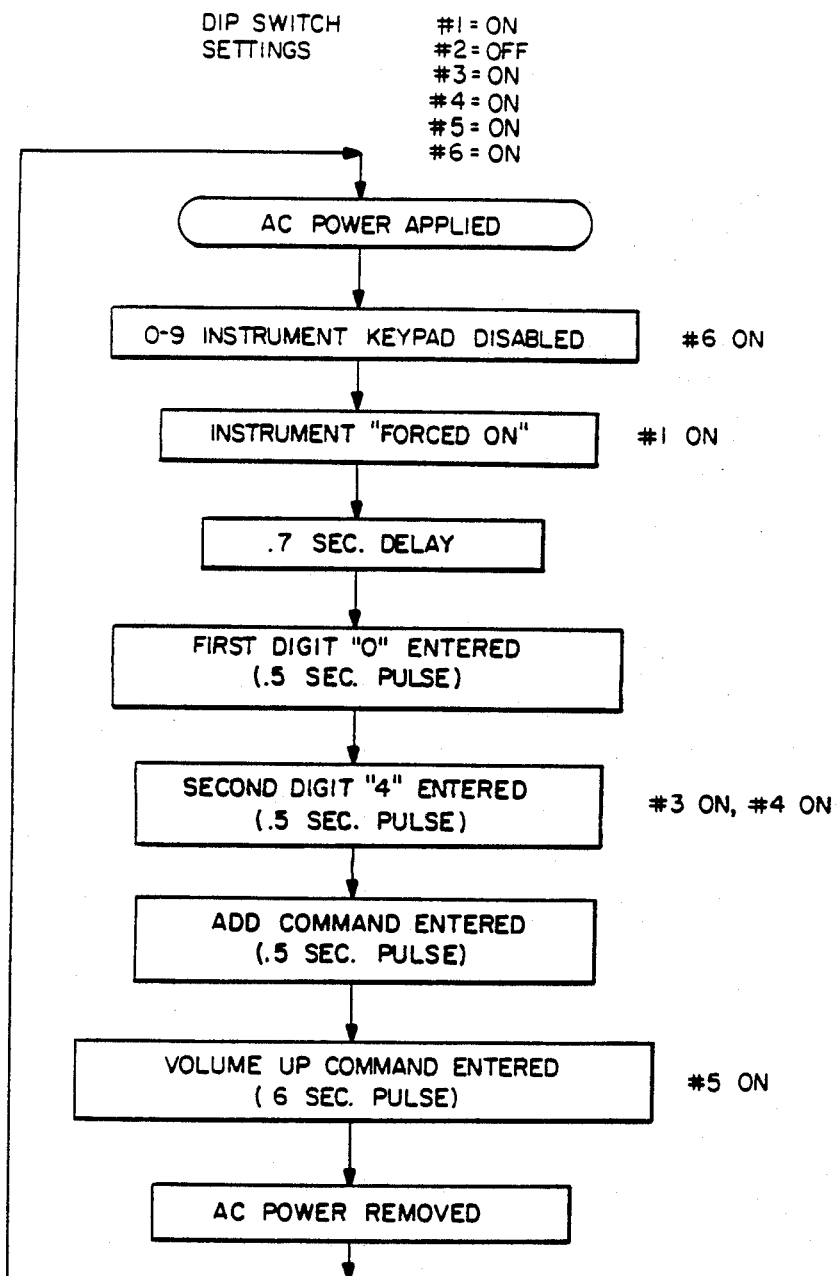

Pulse E is also coupled via forward-biased diode $D_{12}$ to the junction of pull down resistor $R_{22}$ and terminal 5 (−trigger) of $IC_{3A}$, causing $IC_{3A}$ to produce a 0.7 second positive-going signal F at terminal 6 ($Q_A$) when pulse E expires. Pulse F is coupled via capacitor $C_{15}$ and closed switch $IC_{6B}$ to the junction of resistor $R_{28}$ and the control input of switch $IC_{6C}$, causing a 0.5 second switch closure of $IC_{6C}$ which momentarily connects the wires marked SEG6 and SNS2 to simulate a pressing of the "ADD" key of keyboard 110 (on FIG. 1). Thus far, the receiver has been turned on, forced to channel 3, and channel 3 has been added to the preferred channel list stored in tuner memory 125. Pulse F is differentiated by capacitor $C_{14}$ and resistor $R_{29}$ to form pulse G and applied to the junction of pull-down resistor $R_{36}$, the cathode of diode $D_{17}$, and terminal 11 (−trigger) of $IC_{3B}$, causing the generation of a 6 second positive-going pulse H at terminal 10 when pulse G expires. Because witch $Sw_5$ is closed, a high level signal is coupled via resistor $R_{33}$ to the junction of the anode of diode $D_7$ (which is reverse-biased) and the control input of switch $IC_{7D}$ closing switch $IC_{7D}$, for future use. The high level signal from switch $Sw_5$ is also applied to the junction of resistor $R_{35}$ and diode $D_{16}$. This forward-biases diode $D_{16}$ and causes resistor $R_{34}$ to be essentially in parallel with timing resistor $R_{25}$. This reduces the time constant controlling $IC_{3B}$ from approximately 25 seconds to approximately 6 seconds, by lowering the resistance in the charging path of timing capacitor $C_{12}$. Pulse H having a duration of 6 seconds is applied via closed switch $IC_{7D}$ to the junction of resistor $R_{32}$ and the control input of switch $IC_{7C}$, causing switch $IC_{7C}$ to close and connect the wires marked SEG4 and SNS1 together to simulate the pressing and holding of the "volume up" key of keyboard 100 (on FIG. 1) for approximately 6 seconds. This causes the volume at the receiver to be increased to a high level, limited by a volume limiter potentiometer (not shown) located on chassis 130 (of FIG. 1). Selection of channel 4 rather than channel 3 is accomplished in a substantially similar manner, with the exception that switches 1, 3, 4 and 5 are closed, rather than switches 1, 2, 4 and 5. This switch selection exercises the signal paths of resistors $R_{19}$ and $R_{21}$ and diode $D_{11}$, and switch $IC_{5D}$, resistor $R_{27}$, and switch $IC_{6A}$ associated with the selection of channel 4. This operation is illustrated by the flowchart of FIG. 6.

Figure 7:
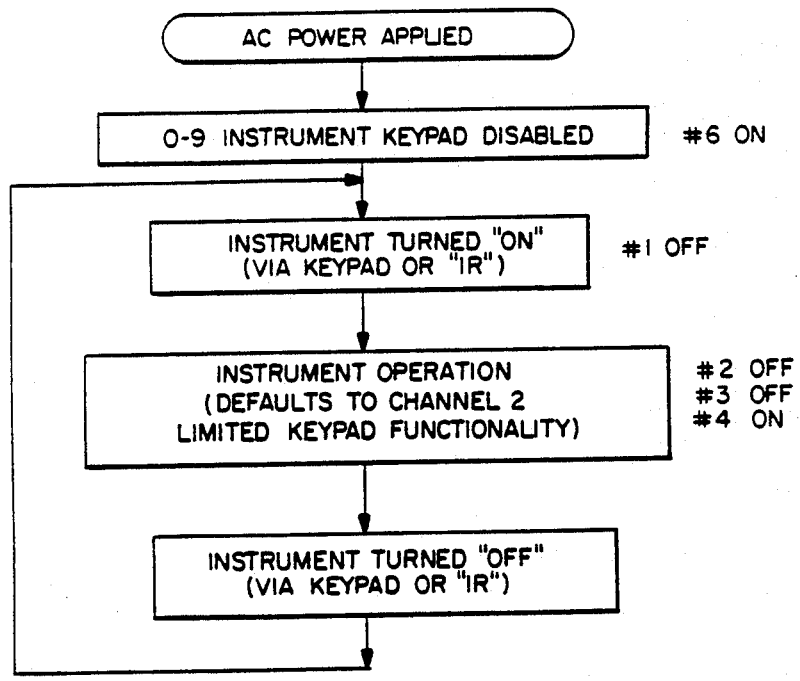

The flowchart of FIG. 7 illustrates the effect of closing only switches 4 and 6. Closing switch 4 disables autoprogramming as described above. Since neither switch 2 nor switch 3 is closed, the receiver is not forced to tune to channel 3 or 4. Therefore, the receiver, when manually turned on, tunes to its default channel (usually channel 2). Closing switch $Sw_6$, removes control voltage from the switch control inputs of switches $IC_{8B}$, $IC_{8C}$, and $IC_{8D}$, by grounding the end of pull-up resistor $R_{37}$, thus opening these switches causing keyboard 100 (of FIG. 1) to be unable to generate the codes corresponding to the numerals 0–9. As a result, a viewer is unable to change channels at the television receiver, and must do so via a cable converter unit.

Figure 8:
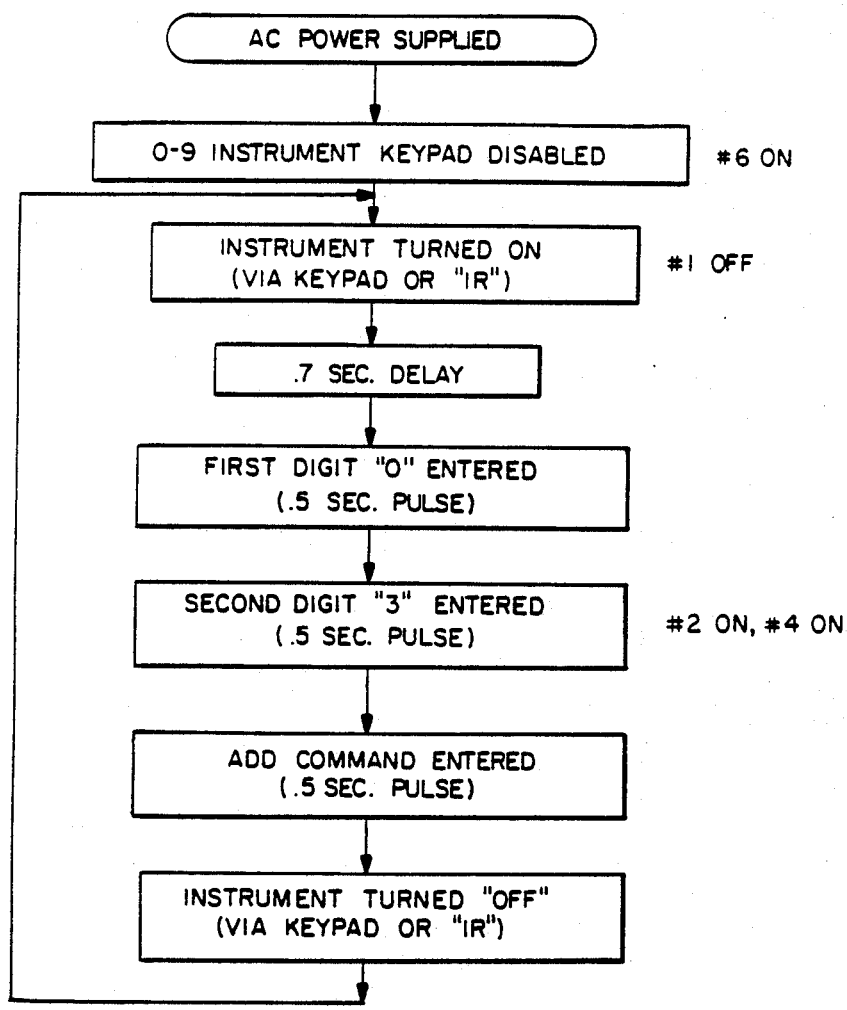

The flowchart of FIG. 8 illustrates the operation of the circuitry of FIGS. 2A and 2B when switches 2, 4 and 6 are closed. Under those conditions manual turn-on, numeric key entry disable, and forced tuning to channel 3 are selected. Note that due to the selection of manual turn-on, automatic volume ramp-up is not available, hence the position of switch $Sw_5$ becomes a "don't care", and is not considered.

There has thus been described an invention which solves the problems noted above with respect to a need for programmability of television receiver operating parameters, due to variation in the circumstances under which television signals are supplied to the receiver (i.e., broadcast, VCR, videodisc, and various cable systems).

What is claimed is:

1. Apparatus for enabling a television receiver, having a source of standby power and a source of operating power, to operate in accordance with preselected operating parameters, comprising:
   means for detecting an initial application of said standby power to said receiver for generating a signal indicative of said initial application of said standby power;
   first programmable switch means having a first position for selecting a first parameter, and having a second position;
   second programmable switch means having a first position for selecting second parameter;
   first control means, coupled to said means for detecting application of standby power and responsive to said first switch means being in said first position and to said indicative signal for generating a first control signal for causing said television receiver to operate in accordance with said selected first operating parameter; and
   second control means, coupled to said first control means and responsive to said second switch means being in said first position and to said first control signal, for generating a second control signal for causing said television receiver to operate in accordance with said selected second operating parameters when said operating power for said receiver is developed.

2. The apparatus of claim 1 wherein said first control means includes means for automatically activating said television receiver.

3. The apparatus of claim 1 wherein said second control means includes means for causing the volume of said television receiver to be set to a predetermined high level, said predetermined high level being at least normal listening level.

4. The apparatus of claim 1 wherein said second parameter is selected from a group of parameters comprising television receiver functions, and said first and second control means further comprise a plurality of diodes interconnected so as to form a hierarchy of selection of said television receiver functions.

5. The apparatus of claim 1 wherein said television receiver includes a tuner having a memory means for storing data indicative of preferred channels and said second control means includes means for automatically autoprogramming said tuner memory means with active channel information.

6. The apparatus of claim 5 wherein said second control means includes means for interrupting the operation of said means for automatically autoprogramming said tuner memory before said automatic autoprogramming function has finished.

7. The apparatus of claim 1 wherein said television receiver includes a tuner having a memory means for storing data indicative of preferred channels, and said second control means includes means for automatically tuning said tuner of said television receiver to a predetermined channel.

8. The apparatus of claim 7 wherein said second control means comprises means for automatically causing the storage of said predetermined channel in said tuner memory means.

9. The apparatus of claim 1 wherein said first and second control means comprise a plurality of series-connected timing means.

10. The apparatus of claim 8 wherein said plurality of timing means include respective timing elements for determining the duration of respective timing signals and one of said timing means further comprises means for altering the configuration of its said respective timing elements so as to alter the duration of its said respective timing signal.

11. The apparatus of claim 1 wherein said television receiver includes a local keyboard, and said first control means includes means for disabling said local keyboard from activation by a user.

12. The apparatus of claim 11 wherein said first and second control means include means coupled to said keyboard for causing the selection of said operating parameters.

13. Apparatus for use in a television receiver having a source of standby power, a source of operating power, volume control means, and means for generating volume control signals, comprising:
   means for detecting an initial application of said standby power to said receiver for generating a signal indicative of said initial application of said standby power;
   first programmable switch means having a first position for selecting a first parameter, and having a second position;
   second switch means having a first state for selecting automatic adjustment of said volume control means to a predetermined level, and a second state;
   first control means, coupled to said means for detecting application of standby power and responsive to said first switch means being in said first position and to said indicative signal for generating a first control signal for causing said television receiver to operate in accordance with said selected first operating parameter; and
   second control means coupled to said first control means and responsive to said second switch means being in said first state and to said first control signal for causing said generating means to generate a volume-up signal and to maintain said volume-up signal for a predetermined time when operating power for said receiver is developed.

14. Apparatus for use in a television-receiver having power on/off control means, and means coupled to said power on/off control means for generating power-on and power-off control signals, comprising:
   switch means having a first state for selecting automatic activation of said receiver, and a second state; and
   control means responsive to said switch means being in said first state and to the application of standby power to said receiver for causing said generating means to generate a power-on signal, and to said switch means being in said second state for deselecting automatic activation of said receiver.

* * * * *